S. S. WILLIAMSON.
DUPLEX GREASE CUP.
APPLICATION FILED MAY 8, 1919.

1,332,453.

Patented Mar. 2, 1920.
2 SHEETS—SHEET 1.

Inventor
Samuel S. Williamson

S. S. WILLIAMSON.
DUPLEX GREASE CUP.
APPLICATION FILED MAY 8, 1919.

1,332,453.

Patented Mar. 2, 1920.
2 SHEETS—SHEET 2.

Inventor

Samuel S. Williamson

UNITED STATES PATENT OFFICE.

SAMUEL S. WILLIAMSON, OF PHILADELPHIA, PENNSYLVANIA.

DUPLEX GREASE-CUP.

1,332,453.　　　　　Specification of Letters Patent.　　　Patented Mar. 2, 1920.

Application filed May 8, 1919. Serial No. 295,607.

*To all whom it may concern:*

Be it known that I, SAMUEL S. WILLIAMSON, a citizen of the United States, residing at Philadelphia, in the county of Philadelphia and State of Pennsylvania, have invented new and useful Improvements in Duplex Grease-Cups, of which the following is a specification.

My invention relates to new and useful improvements in duplex grease cups, and has for its object to so construct a cup of this description that a reservoir or outer cup will be provided for holding a relatively large supply of grease, and an inner or feeding cup will be so located and arranged as to permit the grease to be forced therein when the outer cup is set up, from which inner cup the grease will be fed into the outer cup, creating a pressure in the latter which will deliver the grease to the bearing.

A further object of my invention is to provide for the quick delivery of grease to the inner cup, and the slow or regulated delivery from this inner cup to the outer cup.

A still further object of my invention is to provide for the accurate regulation of the flow of the grease from the inner cup to the outer cup.

A still further object of my invention is to provide for filtering the grease in its passage from the outer cup to the inner cup so as to prevent clogging, and A still further object of my invention is to provide for the ready removal of the feeding mechanism from the inner cup for cleaning purposes.

With these ends in view, this invention consists in the details of construction and combination of elements hereinafter set forth, and then specifically designated by the claims.

In order that those skilled in the art to which this invention appertains may understand how to make and use the same, I will describe its construction in detail, referring by numerals to the accompanying drawing forming a part of this specification, in which.

Figure 1:
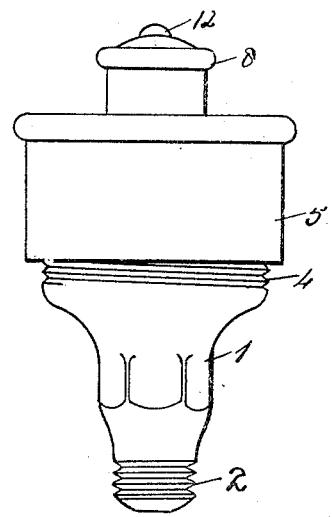
Figure 1 is a side elevation of the grease cup made in accordance with my improvement.
Figure 3:
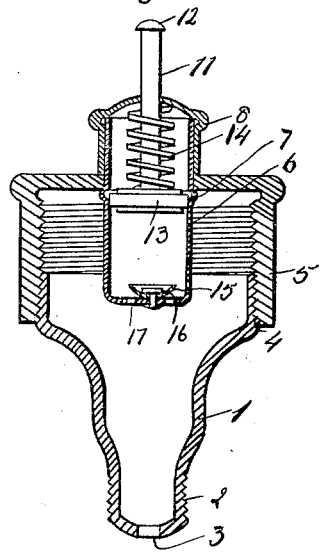
Fig. 3 is a view similar to Fig. 2 showing the position the members will assume when the outer cup is screwed down upon its base and the grease is being forced from the outer cup into the inner cup.
Figure 2:
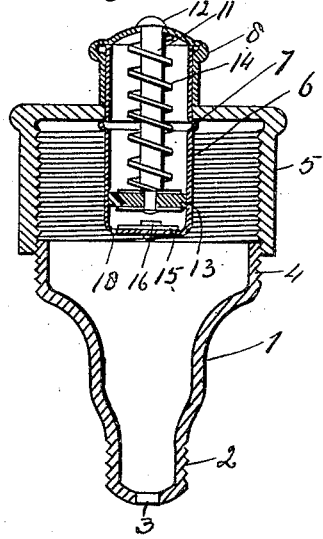
Fig. 2 is a central vertical section of Fig. 1 showing the members in the positions which they would assume just after the cup has been filled with grease.
Figure 4:
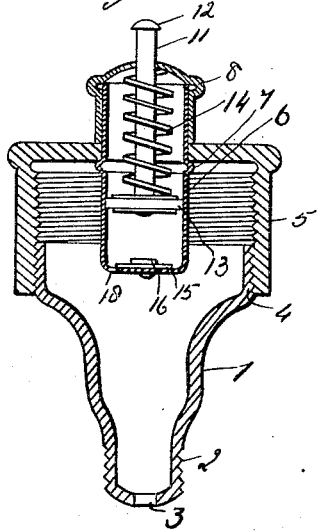
Fig. 4 is a view similar to Fig. 2, showing the members in the position which they would assume after grease has been forced into the inner cup, and the same is being fed therefrom to the outer cup.
Figure 5:
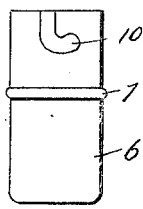
Fig. 5 is a detailed elevation of the inner cup removed from the outer cup.
Figure 7:
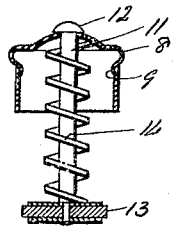
Fig. 7 is a section of the cover of the inner cup showing the feed mechanism carried thereby.
Figure 6:
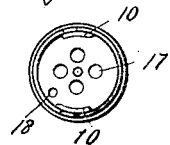
Fig. 6 is a plan view thereof.
Figure 8:
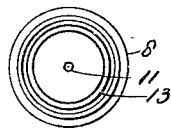
Fig. 8 is a bottom plan view of Fig. 7.

In carrying out my invention as here embodied, 1 represents the bottom or base of a grease cup of any suitable design, having a threaded nipple 2, for screwing into the feed hole of the machine bearing, said nipple having an outlet hole 3 for delivery of grease to said bearing. This base has its upper portion threaded as indicated at 4 for the reception of the outer cup or grease receptacle 5, which latter is threaded internally, and adapted to be screwed its full length down upon the base.

Within the outer cup is located an inner cup 6, which preferably passes through the top of the outer cup and is secured therein, being here shown as placed by the bead 7 formed upon the inner cup abutting against the inner surface of the top of the outer cup.

That portion of the inner cup which projects above the top of the outer cup is adapted to receive the cover 8, which is preferably provided with lugs 9, either formed in the sides of the cover or carried thereby, which lugs are adapted to enter into engagement with the bayonet slots 10, formed in the side walls of the projecting portion of the inner cup, so that this cover may be locked upon the top of the inner cup, as will be readily understood, but this cover may be secured upon the top of the inner cup in any well known and suitable manner.

11 represents a plunger rod, which passes through the cover 8, carrying a head 12 to limit its downward movement by contacting with the top of said cover, and upon the lower end of this rod is secured a suitable plunger 13, which is intended to snugly fit and travel within the lower portion of the inner cup; a spring 14 being interposed between said plunger and the inner surface of said cover, so as to actuate the plunger in one direction.

To the inner surface of the bottom of the inner cup is secured a valve 15, here shown as being held in place by a rivet 16, but which may be secured in any suitable manner, said valve serving to close over the intake holes 17 formed in the bottom of the inner cup when the grease is being forced out of the inner cup, but to open upward uncovering the said holes when grease is being forced from the outer cup into the inner cup.

18 represents the outlet from the inner cup to the outer cup, and is intended to be of such size as to properly time the outflowing of the grease, so as to regulate the delivery of the grease from the outer cup to the machine bearing as will be hereinafter explained.

From the foregoing description it will be obvious that when the outer cup 5 or grease receptacle is removed from the base, and said base and receptacle are filled with grease, and the receptacle replaced upon said base, and screwed downward, a portion of the grease contained therein will be forced through the intake holes 17, lifting the valve 15, and force the plunger upward against the action of the spring 14, until the proper amount of grease had been delivered to the inner cup, after which the action of the plunger under the influence of the spring will tend to force this grease back into the outer cup, which will immediately close the valve, limiting its escape to the outlet 18; and as this outlet is relatively small, the grease will be gradually forced from the inner cup into the outer cup, and the same proportion of grease will be thereby displaced from the outer cup and its base and fed to the bearing.

Since the capacity of the inner cup is relatively small to that of the outer cup and its base, a number of down settings of the outer cup will be necessary to displace all of the grease therein, which down settings force a given amount of grease into the inner cup, from which it will be fed as above described.

By utilizing in the inner cup a relatively small grease capacity, and subjecting the grease therein to relatively high pressure, and limiting the outlet therefrom to a relatively small capacity, great accuracy is had in feeding the grease to the bearing, since the size of the outlet from the base to the bearing has little or no effect upon the regularity of the feed; and a further advantage is gained by this arrangement in that, should the bearing become overheated from any cause, the large opening 5 leading from the base to the bearing permits the ready transmission of this heat to the contents of the cup, and the free flowing of the grease from the cup to the bearing to flush the same, and yet when the bearing has sufficiently cooled, the cup will continue its proper feeding function.

One of the marked advantages of this form of grease cup is that the plunger and its spring may be readily removed from the inner cup for cleaning purposes and replaced, without the use of tools.

Figure 9:
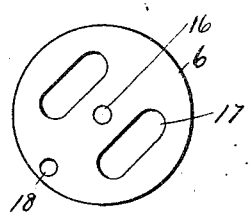
Fig. 9 is an enlarged bottom plan of the inner cup with slightly modified form of intake holes.
Figure 10:
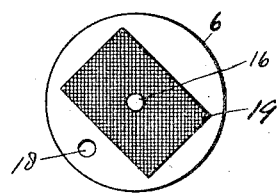
Fig. 10 is a view similar to Fig. 9 showing the filtering medium secured upon the bottom of the inner cup.

In Fig. 9 I have shown the intake openings 17 as being of large capacity by being elongated, thus requiring a less number of such openings.

In practice considerable difficulty has been found in the proper feeding of grease from automatic cups for the reason that foreign matter is often introduced into the cup with the grease, such as saw dust, filings or other dirt, and this foreign matter, when the outlet for the grease from the cup is provided with means for regulation, often clogs the outlet and the cup ceases feeding, without the attendant being aware of the same; from which great damage may result to the machine. This I have overcome by placing a filtering medium 19, such as wire or other gauze over the intake openings in the bottom of the inner cup, so that when the grease is forced from the outer cup into the inner cup, no foreign matter of size sufficient to clog the outlet 18 will be permitted to pass to the inner cup, and as the outlet 3 in the base is intended to be of such size as to permit the passage of any foreign matter which is likely to be contained in the grease, the feeding of the cup cannot be interfered with by such foreign matter.

Figure 11:
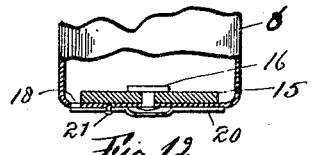
Fig. 11 is an enlarged view of the bottom portion of the inner cup broken away and sectioned so as to show the intake valve and outlet regulator.
Figure 12:
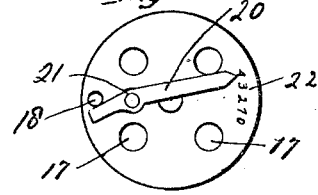
Fig. 12 is a bottom plan of Fig. 11.

In Figs. 11 and 12 I have shown a form of regulator which may be utilized for changing the capacity of the outlet opening 18, which regulator consists of a lever 20, pivoted to the bottom of the inner cup at 21, having its heel end adapted to pass over said outlet, while its opposite end is in the form of a pointer to register with the graduations 22, whereby the amount of regulation may be determined as will be readily understood.

Of course I do not wish to be limited to the exact details of construction here shown, as these may be varied within the scope of the appended claims without departing from the spirit of my invention.

Having thus fully described my invention, what I claim as new and useful is:

1. A duplex grease cup consisting of a base, an outer cup adapted to be threaded upon said base, a secondary cup located within the outer cup, means for permitting the inflow of grease from the outer cup to the secondary cup, and means for feeding said grease from the inner cup to the outer cup whereby the grease in the outer cup will be displaced and fed to the bearing.

2. In a duplex grease cup, a base, an outer cup adapted to be threaded thereon, a secondary cup projecting into the outer cup, means for permitting the free inflow of grease to the inner cup, and means for regulating the outflow of grease from said inner cup.

3. In combination with a grease cup and the base thereof, a secondary cup located in the first named cup, said secondary cup having intake holes, a valve to prevent the outflow of grease through said intake holes, and means for feeding the grease from the secondary cup into the first named cup.

4. In combination with a gease cup, a secondary cup projecting into said grease cup, said secondary cup having intake holes, communicating with the interior of the first named cup; a valve for preventing the outflow of grease through said intake holes, a spring actuated plunger for feeding grease from the secondary cup to the first named cup, and means for regulating the outflow of such grease.

5. In combination with the primary cup, a secondary cup located therein, and having intake holes and outlet holes in the bottom thereof, a plunger fitted to slide in said secondary cup, a spring adapted to force the said plunger in one direction, and permit said plunger to be forced in the opposite direction by the inflow of grease to the secondary cup, and a valve adapted to prevent the inflow of grease through the intake holes, but prevent the outflow therethrough.

6. In combination with a grease cup and the base thereof, a secondary cup projecting into the first named cup, a cover removably mounted upon the outer end of the secondary cup, a plunger adapted to slide within the secondary cup, a plunger rod secured to said plunger and projecting through the cover, a spring interposed between the plunger and the cover, and means for permitting the free flow of grease from the first named cup into the secondary cup and for regulating the outflow thereof.

7. In combination with a grease cup and the base thereof, a secondary cup projecting into the first named cup, a cover removably mounted upon the outer end of the secondary cup, a plunger adapted to slide within the secondary cup, a plunger rod secured to said plunger and projecting through the cover, a spring interposed between the plunger and the cover, means for permitting the free flow of grease from the first named cup into the secondary cup and for regulating the outflow thereof, and means for filtering the grease in its passage from the first named cup to the secondary cup.

8. In a grease cup, the combination of a primary receptacle, a secondary receptacle, and means for permitting the free inflow of grease from the primary receptacle to the secondary receptacle, and limiting the outflow from the latter.

9. In combination with the primary receptacle of a grease cup, a secondary receptacle having a bottom, with openings therethrough for the passage of grease from and to the primary receptacle, and means for closing certain of said openings against the outflow of grease from the secondary receptacle.

10. In combination with the primary receptacle of a grease cup, a secondary receptacle having a passage communicating with the primary receptacle, and means for controlling the outflow of grease through said passage.

In testimony whereof I have hereunto affixed my signature.

SAMUEL S. WILLIAMSON.